United States Patent [19]

Cho

[11] Patent Number: 4,924,483
[45] Date of Patent: May 8, 1990

[54] TRACK COUNTING CIRCUIT FOR USE IN AN OPTICAL DISK DRIVER

[75] Inventor: Hun C. Cho, Seoul, Rep. of Korea

[73] Assignee: Samsung Electronics Co. Ltd., Suwon, Rep. of Korea

[21] Appl. No.: 245,582

[22] Filed: Sep. 16, 1988

[30] Foreign Application Priority Data

Sep. 17, 1987 [KR] Rep. of Korea .............. 1987-10329

[51] Int. Cl.$^5$ .................. H03K 5/24; H03K 21/02
[52] U.S. Cl. ............................. 377/3; 377/45;
    377/55; 307/354; 307/360
[58] Field of Search ............... 377/3, 17, 45, 55;
    307/354, 360

[56] References Cited

U.S. PATENT DOCUMENTS

| | | | |
|---|---|---|---|
| 3,588,885 | 6/1971 | Schaal | 377/17 |
| 4,220,849 | 9/1980 | Harzar | 377/55 |
| 4,306,220 | 12/1981 | Schwefel et al. | 377/3 |
| 4,352,010 | 9/1982 | Koogler | 377/45 |
| 4,475,086 | 10/1984 | Allen | 377/45 |
| 4,528,682 | 7/1985 | Nakaoki | 377/45 |

Primary Examiner—John S. Heyman
Attorney, Agent, or Firm—Fleit, Jacobson, Cohn, Price, Holman & Stern

[57] ABSTRACT

A track counting circuit for an optical disk driver is disclosed. The pickup passing a track is detected through a differential amplifier receiving signals from photo diodes, an amplifier, a tracking processor, a positive zero crossing detector, and a negative zero crossing detector. The signals sensed by photo diodes are applied to one of the input terminals of each of a pair of NAND gates through a differential amplifier, level comparators and a flip-flop, and the other input terminals of the NAND gates receive the signals which are obtained by the signals sensed by the photo diodes being processed through an adder and a level comparator to distinguish whether the pickup is placed on the track or land of the disk, the output signals of the NAND gates controlling the output signals of a flip-flop which control an up-/down counter to make an up/down count depending on the moving direction of the pickup on the track so that the intended track is found precisely and easily.

22 Claims, 5 Drawing Sheets

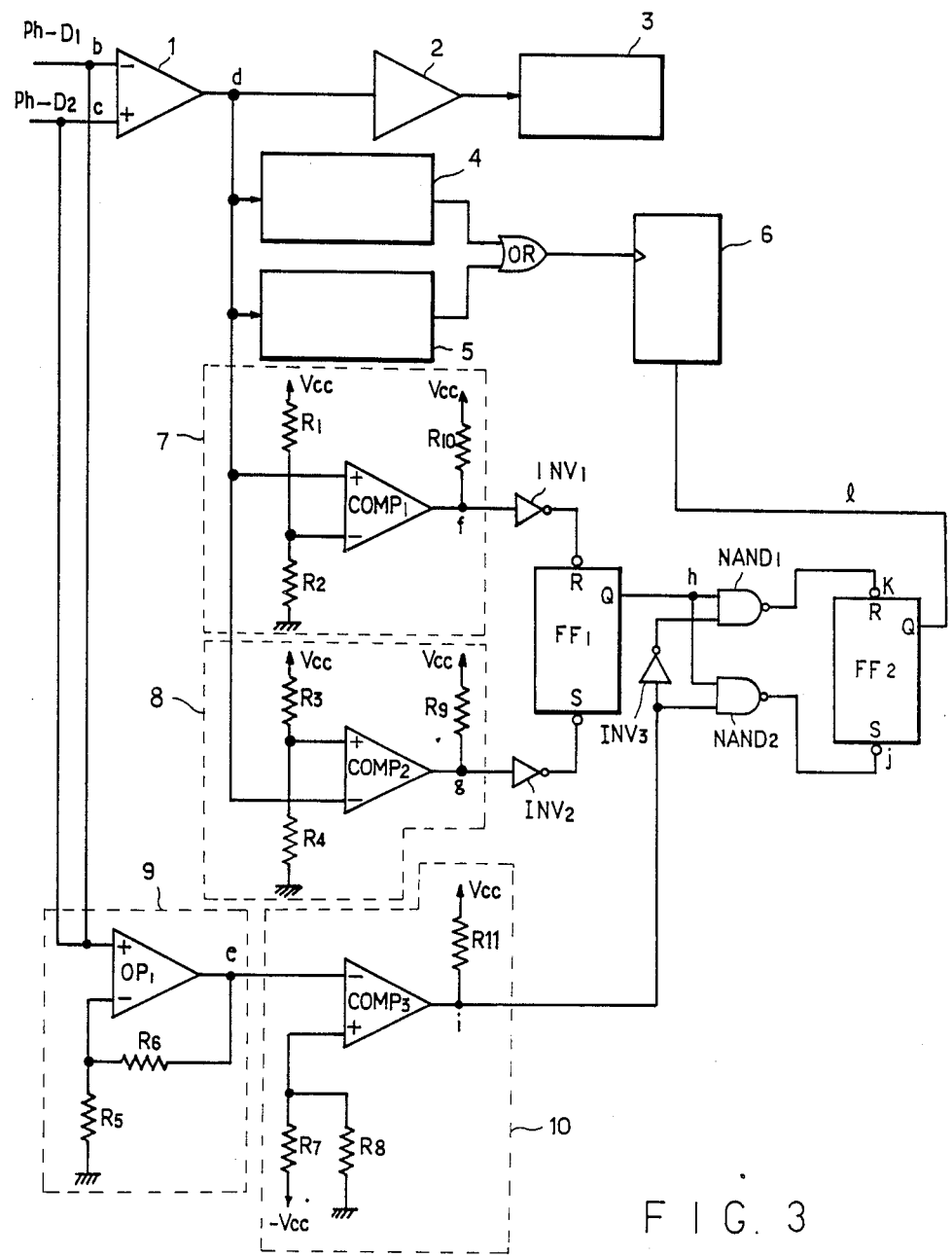
F I G. 3

TRACK COUNTING CIRCUIT FOR USE IN AN OPTICAL DISK DRIVER

BACKGROUND OF THE INVENTION

This invention relates to a track counting circuit for an optical disk driver having a high speed searching algorithm for finding a track, which precisely counts the intended track and thereby enables easy searching of the track by using an up/down counter.

In a conventional optical disk driver, the intended track is found by using a tracking counter which counts the number of data tracks one by one. However, the mass of the optical pickup frequently results in the pickup travelling beyond the intended track because of inertial force and eccentricity. Thus, the optical pickup must be moved backwards. Because the tracking counter continues to count the number upwards regardless of the optical pickup moving forwards or backwards, in finding the intended track the tracking counter needs to be reloaded or the track identifying numbers recorded on the optical disk are identified one by one to find the intended track. Accordingly it becomes very difficult to find the intended data track with high speed and there occurs a problem because the algorithm for searching with high speed is complicated. Generally, the high speed searching algorithm to find a track by using the push-pull tracking servo-mechanism involves tracking error signals in order to count up to the intended track, wherein the tracking error signals are obtained, as shown in FIGS. 1A, 1B and 1C depending on the relative position of the beam reflected from the track. Namely, the track is counted by using the tracking error signals, which are employed in the high searching algorithm.

In other words, as shown in FIG. 2, the intended track is set by a microcomputer, by which the track is compared with the track count, and if the intended track is not reached, the microcomputer causes a stepping motor to keep on running. However, since the optical pickup has mass causing inertia, it can not stop at the exact track and frequently goes beyond the intended track. Hence, the optical pickup must be moved backwards, which consequently increases the track count, so that the precise track count is hardly maintained. Namely, the track count is always increased regardless of the optical pickup moving forwards or backwards.

Consequently, in order to find the intended track, the microcomputer resets the intended track buffer or the track identifying numbers recorded on the optical disk are identified one by one to find the intended track, so that it is very difficult to find the intended data track at high speed and there occurs a conflict with the algorithm for exploring at high speed.

SUMMARY OF THE INVENTION

The object of the present invention is to provide an improved track counting circuit. It is another object to provide a track counting circuit for use in an optical disk driver, whereby the intended track is precisely and easily detected.

According to the present invention, the signals sensed by photo diodes are applied to one input terminal of NAND gates through a differential amplifier, level comparators and a flip-flop, and the other input terminals of the NAND gates receive the signals which are obtained by the signals sensed by the photo diodes being processed through an adder and a level comparator and distinguish whether the pickup is placed on the track or land of the disk, the output signals of the NAND gates controlling the output signals of a flip-flop which control an up/down counter to make an up/down counting operation depending on the moving direction of the pickup on the track so that the intended track is found precisely and easily.

BRIEF DESCRIPTION OF THE DRAWINGS

The present invention will now be described specifically with reference to the drawings attached by way of example only, in which:

FIG. 3 is a schematic circuit diagram of the track counting circuit of the present invention.

PREFERRED EMBODIMENT OF THE PRESENT INVENTION

Figure 1A:
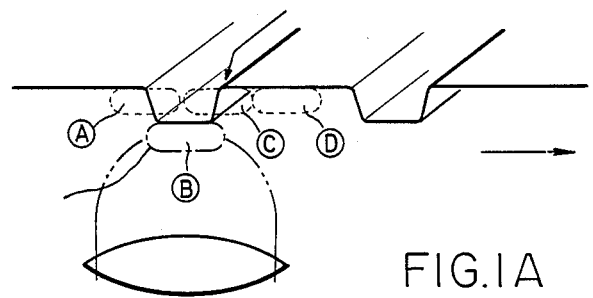
FIGS. 1A, 1B and 1C provide a waveform diagram showing how the pickup detects tracks of an optical disk.
Figure 1B:
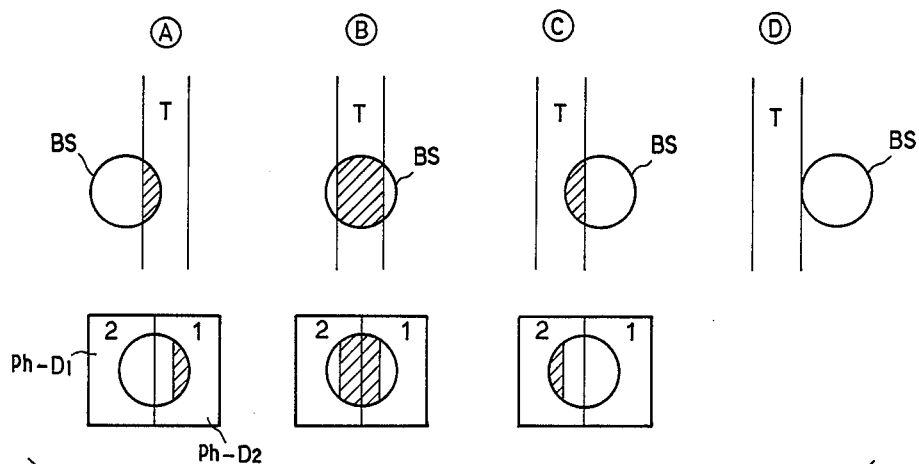
Figure 1C:
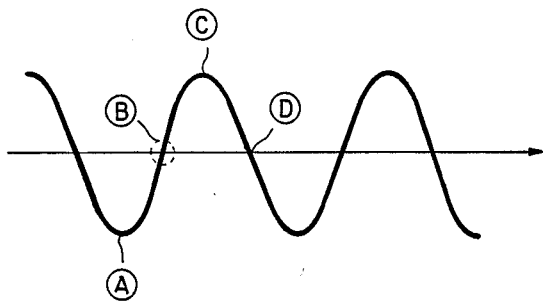
Figure 2:
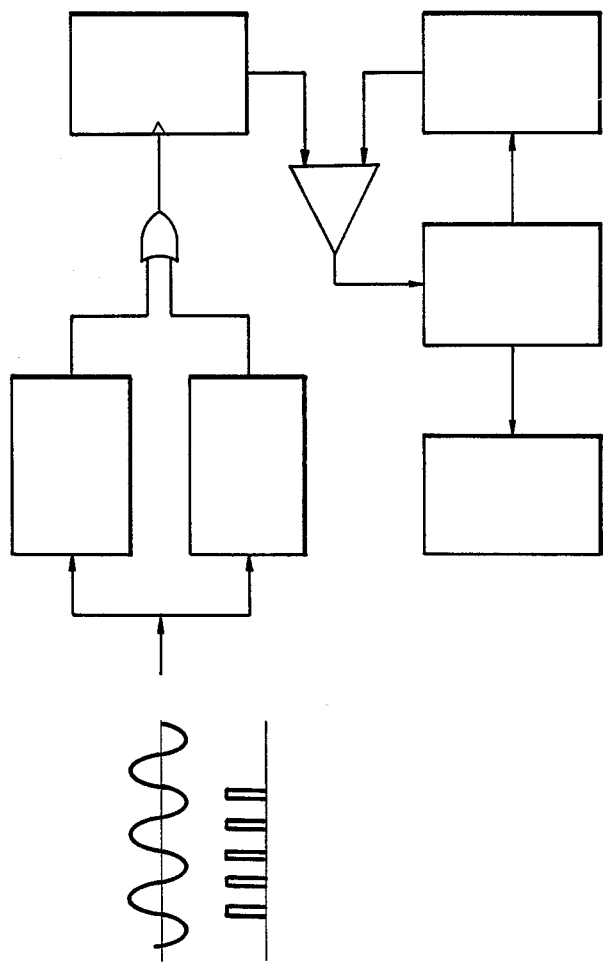
FIG. 2 is a block diagram of a track counting circuit of prior art.

Hereinafter, the operation and effect of the present invention will be explained.

As shown in FIG. 3, in a data track counting circuit for an optical disk driver wherein the output signal of a differential amplifier 1 receiving signals from photo diodes Ph-D1 and Ph-D2 is amplified and processed through an amplifier 2 and a tracking processor 3, while detecting through a positive zero crossing detector 4 and negative zero crossing detector 5 the pickup passing a track, thereby counting the tracks through an OR gate, the present invention is characterized in that the output signal d of the differential amplifier 1 is applied to a level comparator 7 comprising a comparator COMP 1 and resistors R1, R2 and R10 and another level comparator 8 comprising a comparator COMP 2 and resistors R3, R4 and R9. The output terminals f and g of the level comparators 7 and 8 are respectively connected with the reset terminal R and set terminal S of a flip-flop FF1 through each of inverters INV 1 and INV 2, the output terminal Q of the flip-flop FF1 is connected with one input terminal of NAND gates NAND 1 and NAND 2, the output signals of the photo diodes Ph-D1 and Ph-D2 are applied to the other input terminal of the NAND gates NAND 1 and NAND 2 through the output terminal e of an adder 9 comprising an operational amplifier OP1 and resistors R5 and R6 and the output terminals i and i of a level comparator 10 comprising a comparator COMP 3 and resistors R7, R8 and R11, and to the other input terminal of the NAND gate NAND 1 through an inverter INV3, the output terminals of the NAND gates NAND 1 and NAND 2 are respectively connected with the set and reset terminals S and R of another flip-flop FF2, and the output terminal Q of the flip-flop FF2 is connected with the up/down control terminal of an up/down counter 6.

Figure 4A:
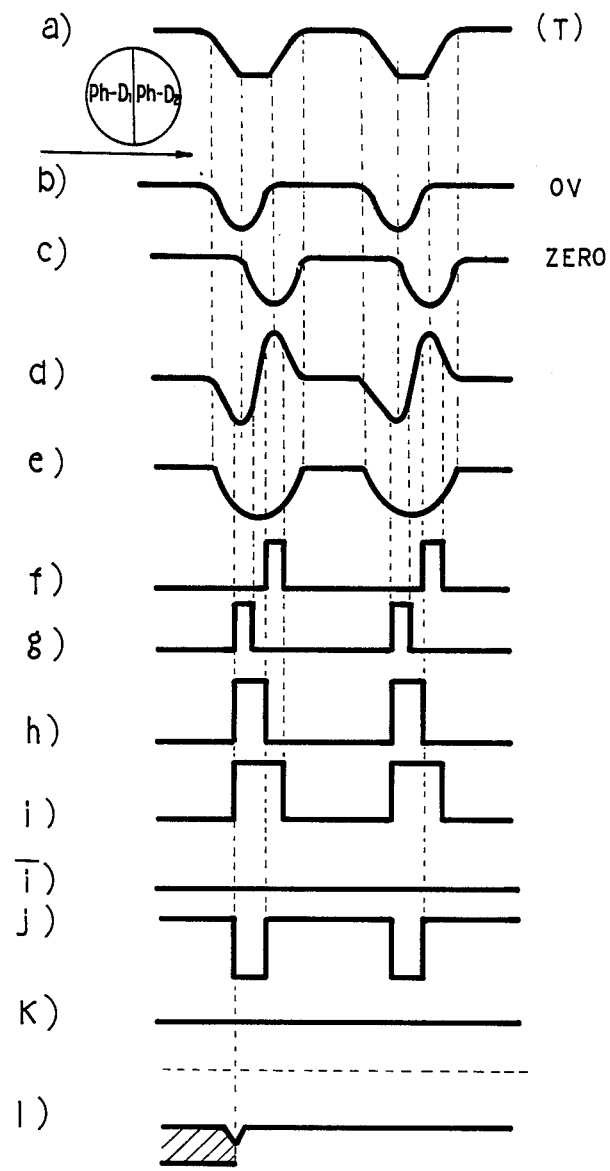
FIG. 4 shows the waveforms appearing in the track counting circuit of the present invention, where waveforms (b) through (1) of FIG. 4A represent the waveforms appearing in up counting, and waveforms (f) through (1) of FIG. 4B represent the waveforms appearing in down counting.

The photo diodes Ph-D1 and Ph-D2 sense the track T of the optical disk as shown by a of FIG. 4A to produce the output signals as shown by b and c of FIG. 4A. These output signals are added to produce a resulting signal by an adder 9 comprising resistors R5 and R6 and an operational amplifier OP1 of FIG. 3. The resulting signal is input to the inverting terminal of the comparator COMP 3 of a level comparator 10 and compared with the reference voltage $$V = \frac{R_8}{R_7 + R_8} \times (-Vcc) \qquad (1)$$

which is input to the non-inverting terminal of the comparator COMP 3 so that if the added signal is lower than the reference voltage, the level comparator operates at the higher signal, the output voltage of the level comparator 10 being high to indicate that the pickup is placed on the track and low to indicate that the pickup is placed on the land.

On the other hand, the output signals of the photo diodes Ph-D1 and Ph-D2 sensing the signal of the disk track T are input to the differential amplifier 1 to be differentially amplified. The output terminal d of the differential amplifier produces an output as shown by d of FIG. 4A, which output signal is amplified and processed through the conventional amplifier 2 and tracking processor 3, and is applied to the clock terminal of the up/down counter 6 through the positive and negative crossing detectors 4 and 5 and the OR gate. Further, the output signal of the output terminal d of the differential amplifier is applied to the comparators COMP 1 and COMP 2 of the level comparators 7 and 8, when a negative one of the output signals d of the differential amplifier 1 is input to the inverting terminal of the comparator COMP 2 and positive one thereof is input to the non-inverting terminal of the comparator COMP 1.

Thus, the comparator COMP 2 of the level comparator 8 compares the input voltage from the differential amplifier 1 with the reference voltage $$V = \frac{R_4}{R_3 + R_4} + (-Vcc) \qquad (2)$$

of the comparator COMP 2 and senses the tracking error signal below the down level to produce at its output terminal g an output wave form as shown by g of FIG. 4A, while the comparator COMP 1 of the level comparator 7 compares the input voltage from the differential amplifier 1 with the reference voltage $$V = \frac{R_2}{R_1 + R_2} \times Vcc \qquad (3)$$

of the comparator COMP 1 and senses the tracking error signal above the up level to produce at its output terminal f an output wave form as shown by f of FIG. 4A.

In this output state, the procedure of up counting and down counting will be specifically explained as follows.

The comparator COMP 1 of the level comparator 7 and the comparator COMP 2 of the level comparator 8 are made such that the down level signal of the output signals as the tracking error signal, i.e., the output signal g of the level comparator 8 is first sensed, and then, the up level signal, i.e., the output signal f of the level comparator 7 is sensed. In this order and range, the output terminal Q of the flip-flop FF1 produces the high signal which is applied to one input terminal of the NAND gates NAND 1 and NAND 2 to operate them.

For further explanation, when the level comparator 8 senses the down level one of the output signals d of the differential amplifier 1, the comparator COMP 2 of the level comparator 8 produces at its output terminal g the high signal which is inverted by the inverter INV2 to apply the low signal to the set terminal S of the flip-flop FF1, so that the output terminal Q of the flip-flop FF1 produces the high signal which is applied to the one input terminals of the NAND gates NAND 1 and NAND 2 to operate them, when the comparator COMP 3 of the level comparator 10 compares the output voltage e of the adder 9 with the reference voltage to distinguish whether the pickup is placed on the track or on the land, so that if the output voltage e is below the reference voltage, the high signal is produced and is inverted by the inverter INV3 to apply the low signal to the other input terminal of the NAND gate NAND 1, and the other input terminal of the NAND gate NAND 2 receives a high signal, thereby applying to the set terminal of the flip-flop FF2 the low signal as shown by j of FIG. 4A. Furthermore, the reset terminal R of the flip-flop FF2 receives the high signal as shown by k of FIG. 4A so as not to make a reset operation, while the set terminal S of the flip-flop FF2 receives the low signal to make a set operation, so that the output terminal Q of the flip-flop FF2 produces the high signal as shown by I of FIG. 4A to control the up/down control terminal CTL of the up/down counter 6, thereby up counting the clock pulses input to the clock terminal of the up/down counter 6.

Thereafter, when the comparator COMP 1 of the level comparator 7 senses the up level signal above the reference signal of the output signal d of the differential amplifier 1, the output terminal f of the comparator COMP 1 produces the high signal which is inverted by the inverter INV1 to apply the low signal to the reset terminal R of the flip-flop FF1 so that the output terminal Q of the flip-flop FF1 produces the low signal to apply it to the one input terminals of the NAND gates NAND 1 and NAND 2.

Subsequently, the output terminals of the NAND gates NAND 1 and NAND 2 apply the high signal to the set and reset terminals S and R of the flip-flop FF2 respectively, so that the signal of the output terminal Q of the flip-flop FF2 is not changed and the up/down counter 6 continues to up count.

Figure 4B:
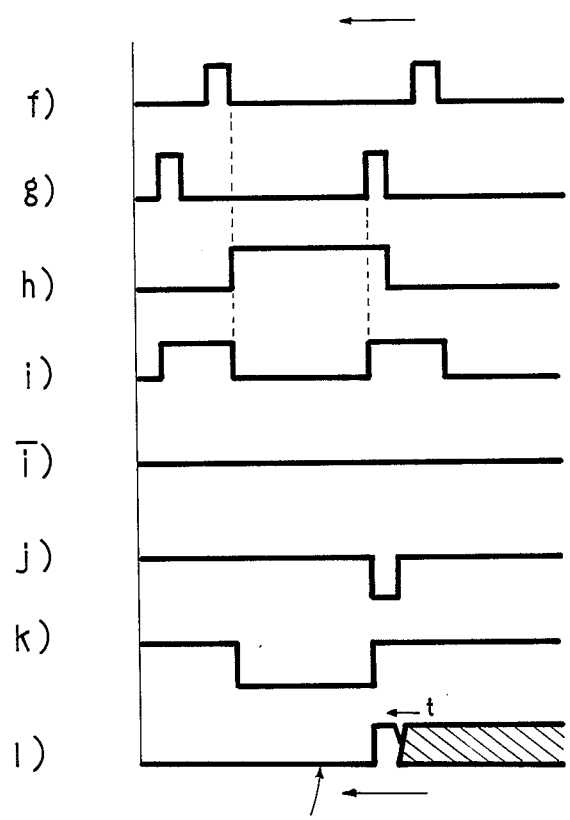

While up counting, if the pickup exceeds the intended data track, it is caused to move backwards to the intended data track by a conventional control unit (not shown in the drawings), when the output terminal Q of the flip-flop FF1 maintains the high state as shown by h of FIG. 4B, and the output voltage i' of the level comparator 10 becomes higher than the reference voltage to produce the high signal of the wave form as shown by i' of FIG. 4B, so that the other input terminal of the NAND gate NAND 2 receives the low signal and the other input terminal of the NAND gate NAND 1 receives the high signal inverted by the inverter INV 3. Therefore, the set terminal S of the flip-flop FF2 receives the high signal as shown by j of FIG. 4B, so that the flip-flop FF2 can not make a set operation, while the reset terminal of the flip-flop FF2 receives from the NAND 1 the low signal as shown by k of FIG. 4B, so that the flip-flop FF2 makes a reset operation and the output terminal Q of the flip-flop FF2 applies the low signal as shown by l of FIG. 4B to the up/down control terminal of the up/down counter to counter to control it, thereby down counting.

As in the above up counting operation, if the reset terminal R of the flip-flop FF1 receives the low signal, the output terminal Q of the flip-flop FF1 produces the low signal which, through the NAND gates NAND 1 and NAND 2, produces the high signal applied to the set terminal S and reset terminal R of the flip-flop FF2, so that the output signal of the output terminal Q of the flip-flop FF2 is not changed and does not influence the down control terminal CTL of the up/down counter 6, thereby continuing the down counting to the amount exceeding the intended data track.

The operation of the flip-flop FF1 makes possible to distinguish whether the pickup is placed on the track or the land, i.e., if the output of the flip-flop FF1 is high, the minimum level to the positive zero crossing causes the maximum level up counting to be made, while if the output of the flip-flop FF1 is low, the minimum level to the negative zero crossing causes the maximum level down counting to be made.

As described above, the present invention, in a high speed exploration algorithm of an optical disk driver, applies the difference between the sum of the output voltages of the photo diodes when the optical pickup moves forward and when the optical pickup moves backward, and the voltage detected by the comparators to the flip-flops and NAND gates whose output signals control the up/down counter, so that the intended data track is found precisely and easily.

What is claimed is:

1. A track counting circuit for use in an optical disk driver, comprising:
   a differential amplifier connectable to a plurality of photo diodes subjectable to exhibiting a direction of movement, said differential amplifier receiving signals from photo diodes as the photodiodes traverse tracks and lands of a disk and providing output signals in correspondence thereto;
   a positive zero crossing detector and a negative zero crossing detector operating upon said output signals to generate said indication signals indicative of movement of the photo diodes relative to the track an lands;
   counting means for making a count of the tracks in response to indication signals;
   first logic means including a first logic device, for operating on said output signal to detect and provide tracking signals indicating direction of movement the photodiodes,
   second logic means for operating on said output signal to distinguish and generate a comparison signals indicating whether the photodiodes are placed on a track or land of a disk,
   a second logic device controlling whether said counting means makes an up count or down count of the tracks,
   third logic means coupled between said second logic device and said first and second logic means, for responding to said tracking signal and comparison signal, whereby said third logic means and second logic device are controlled, thereby controlling the up count or down count of the tracks by said counting means.

2. The track counting circuit of claim 1, further comprised of said second logic device generating a control signal having a first logic state when said tracking signal indicates one moving direction of the photodiodes and a second logic state when said tracking signal indicates another moving direction of the photodiodes.

3. The track counting circuit of claim 2, further comprised of said second logic device exhibiting a change in said first logic state when said tracking signal indicates said one moving direction and said comparison signal first indicates that said photodiodes are placed on a track.

4. The track counting circuit of claim 2, further comprised of said second logic device exhibiting a change from said first logic state to said second logic state when said tracking signal indicates said another moving direction and said comparison signal first indicates that said photodiodes are placed on a track.

5. The track counting circuit of claim 3, further comprised of said second logic device exhibiting a change from said first logic state to said second logic state when said tracking signal indicates said another moving direction and said comparison signal first indicates that said photodiodes are placed on a track.

6. A track counting circuit, comprising:
   sensing means providing output signals giving indications of a pickup transversing tracks;
   means for converting said output signals into a difference signal;
   means for counting said indications on the basis of said difference signal;
   means for operating upon said output signals to provide a first comparison signal exhibiting a first logic state when said output signals indicate that the pickup is on a track and a second logic state when said output signals indicate that the pickup is between tracks; and
   logic means for operating on said difference signal and said first comparison signal to control whether said counting means makes an up count or a down count of said indications by providing a control signal exhibiting a first logic state during forward movement of the pickup relative to a plurality of tracks and a second logic state during reverse movement of the pickup relative to the plurality of tracks.

7. The track counting circuit of claim 6, wherein said logic means comprises:
   detecting means providing a tracking signal for detecting whether said pickup is making forward or reverse movement relative to the plurality of tracks;
   a plurality of logic gates driven by said first comparison signal and said tracking signal; and
   means controlled by said plurality of logic gates, for providing said control signal.

8. The track counting circuit of claim 7, wherein said detecting means comprises:
   first comparison means for generating a first intermediate signal when said sensing means indicates that said pickup is transversing a track; and
   second comparison means for generating a second intermediate signal when said sensing means indicates that said pickup is completing the transversing of a track.

9. The track counting circuit of claim 8, wherein said detecting means comprises a logic stage controlled by said first and second intermediate signals to provide said tracking signal.

10. The track counting circuit of claim 7, further comprised of said means controlled by said plurality of logic gates causing a change in said first logic state of said control signal when said tracking signal indicates forward movement of the pickup and said comparson signal first indicates that said pickup is transversing a track.

11. The track counting circuit of claim 7, further comprised of said means controlled by said plurality of logic gates causing a change in said control signal from said first logic state to said second logic state when tracking signal indicates said reverse movement of the pickup and said comparison signal first indicates that said pickup is transversing a track.

12. The track counting circuit of claim 10, further comprised of said means controlled by said plurality of logic gates causing a change in said control signals from said first logic state to said second logic state when said tracking signal indicates said reverse movement of the pickup and said comparison signal first indicates that said pickup is transversing a track.

13. A track counting circuit for use in an optical disk driver, comprising:
input means connectable to receive input signals generated by photo diodes amenable to representing directions of movement relative to lands and tracks of a disk, said input means providing output signals based upon said input signals, said output signals exhibiting positive and negative going portions;
a plurality of zero crossing detectors coupled to receive said output signals and generate crossing signals based upon said output signals;
counting means for making a count of the tracks in response to said crossing signals;
a first level comparator coupled to receive said output signals and a first reference signal, and generate first intermediate signals based upon said output signals and first reference signal;
a second level comparator coupled to receive said output signals and a second reference signal, and generate second intermediate signals based upon said output signals and second reference signal;
a first logic device responding to said first and second intermediate signals by generating tracking signals indicating directions of movement of the photodiodes;
an adder connectable to receive said input signals and generate resulting signals based upon said input signals;
a third level comparator generating on the basis of said resulting signals and a third reference signal, comparison signals indicating a disposition of the photo diodes relative to a track or a land of a disk;
a plurality of logic gates coupled between said first logic device and said second level comparator, of said logic gates each gates generating logic signals on the basis of said tracking signals and comparison signals; and
a second logic device controlling whether said counting means makes an up count or down count of the tracks on the basis of said logic signals.

14. The circuit of claim 13, wherein:
said first level comparator has a non-inverting terminal coupled to receive said output signal and an inverting terminal coupled to receive a third reference signal;
said second level comparator has an inverting terminal coupled to receive said output signal and a non-inverting terminal coupled to receive a fourth reference signal;
said first logic device comprises a first multivibrator having one of a set and a reset terminal coupled to receive said first intermediate signals, and the other of said set and reset terminal coupled to receive said second intermediate signals.

15. The circuit of claim 13, wherein:
said plurality of logic gates comprise:
a first logic gate coupled to respond to said tracking signals and comparison signals by generating a first one of said logic signals, and
a second logic gate coupled to respond to said tracking signals and comparison signals by generating a second one of said logic signals; and
said second logic device comprises a multivibrator having one of a set and a reset terminal coupled to receive said first one of said logic signals, and the other of said set and reset terminals coupled to receive said second one of said logic signals.

16. The circuit of claim 14, wherein:
said plurality of logic gates comprise:
a first logic gate coupled to respond to said tracking signals and comparison signals by generating a first one of said logic signals, and
a second logic gate coupled to respond to said tracking signals and comparison signals by generating a second one of said logic signals; and
said second logic device comprises a second multivibrator having one of a set and a reset terminal coupled to receive said first one of said logic signals, and the other of said set and reset terminals coupled to receive said second one of said logic signals.

17. The circuit of claim 13, wherein:
said adder has a non-inverting terminal coupled to receive said input signals and an inverting terminal coupled to receive a third reference signal; and
said third level comparator has an inverting terminal coupled to receive said resulting signals and a non-inverting terminal coupled to receive a fourth reference signal, whereby said comparison signals exhibit a plurality of logic states with a first of said logic states indicating that said photo diodes are disposed over a land of a disk and a second of said logic states indicating that said photo diodes are disposed over a track of a disk.

18. The circuit of claim 14, wherein:
said adder has a non-inverting terminal coupled to receive said input signals and an inverting terminal coupled to receive a fifth reference signal; and
said third level comparator has an inverting terminal coupled to receive said resulting signals and a non-inverting terminal coupled to receive a sixth reference signal, whereby said comparison signals exhibit a plurality of logic states with a first of said logic states indicating that said photo diodes are disposed over a land of a disk and a second of said logic states indicating that said photo diodes are disposed over a track of a disk.

19. The circuit of claim 15, wherein:
said adder has a non-inverting terminal coupled to receive said input signals and an inverting terminal coupled to receive a third reference signal; and
said third level comparator has an inverting terminal coupled to receive said resulting signals and a non-inverting terminal coupled to receive a fourth reference signal, whereby said comparison signals exhibit a plurality of logic states with a first of said logic states indicating that said photo diodes are disposed over a land of a disk and a second of said logic states indicating that said photo diodes are disposed over a track of a disk.

20. The circuit of claim 13, wherein:
said second level comparator has an inverting terminal coupled to receive said output signal and a non-inverting terminal coupled to receive a third reference signal, whereby said second intermediate signals exhibit a first change in characteristic as said input signals indicate that the direction of movement is from a track to a land of a disk;
said first level comparator has a non-inverting terminal coupled to receive said output signal and an inverting terminal coupled to receive a fourth reference signal, whereby said first intermediate signals exhibit a second change in characteristic as said input signals indicate that the direction of movement is from a land to a track of a disk; and
said first logic device comprises a first multivibrator having one of a set and a reset terminal coupled to receive said first intermediate signals, and the other of said set and reset terminal coupled to receive said second intermediate signals, whereby said tracking signals exhibit a first logical condition during a duration between said first and second changes in characteristic and a second logical condition during a duration between said first and second changes in characteristic.

21. The circuit of claim 20, wherein:
said adder has a non-inverting terminal coupled to receive said input signals and an inverting terminal coupled to receive a fifth reference signal; and
said third level comparator has an inverting terminal coupled to receive said resulting signals and a non-inverting terminal coupled to receive a sixth reference signal, whereby said comparison signals exhibit a plurality of logic states with a first of said logic states indicating that said photo diodes are disposed over a land of a disk and a second of said logic states indicating that said photo diodes are disposed over a track of a disk.

22. The circuit of claim 13, wherein:
said second level comparator has an inverting terminal coupled to receive said output signal and a non-inverting terminal coupled to receive a third reference signal, whereby said second intermediate signals exhibit a first change in characteristic as said input signals indicate that the direction of movement is from a track to a land of a disk;
said first level comparator has a non-inverting terminal coupled to receive said output signal and an inverting terminal coupled to receive a fourth reference signal, whereby said first intermediate signals exhibit a second change in characteristic as said input signals indicate that the direction of movement is from a land to a track of a disk;
said first logic device comprises a first multivibrator having one of a set and a reset terminal coupled to receive said first intermediate signals, and the other of said set and reset terminal coupled to receive said second intermediate signals, whereby said tracking signals exhibit a first logical condition during a duration between said first and second changes in characteristic and a second logical condition during a duration between said first and second changes in characteristic;
said adder has a non-inverting terminal coupled to receive said input signals and an inverting terminal coupled to receive a fifth reference signal;
said third level comparator has an inverting terminal coupled to receive said resulting signals and a non-inverting terminal coupled to receive a sixth reference signal, whereby said comparison signals exhibit a plurality of logic states with a first of said logic states indicating that said photo diodes are disposed over a land of a disk and a second of said logic states indicating that said photo diodes are disposed over a track of a disk.
said plurality of logic gates comprise:
a first logic gate coupled to respond to said tracking signals and comparison signals by generating a first one of said logic signals, and
a second logic gate coupled to respond to said tracking signals and comparison signals by generating a second one of said logic signals;
and
said second logic device comprises a second multivibrator having one of a set and a reset terminal coupled to receive said first one of said logic signals, and the other of said set and reset terminals coupled to receive said second one of said logic signals.

* * * * *